Patented Sept. 25, 1934

1,974,624

UNITED STATES PATENT OFFICE 1,974,624

LAMINATED GLASS AND PROCESS OF MAKING THE SAME

Paul R. Morris, Tarentum, Pa., assignor to Duplate Corporation, a corporation of Delaware No Drawing. Application August 28, 1931, Serial No. 559,934

5 Claims. (Cl. 49—81)

The invention relates to laminated or safety glass which ordinarily consists of two sheets of glass cemented to the opposite sides of a sheet of cellulose ester plastic, such as some form of celluloid or cellulose acetate. The primary objects of the invention are to provide a laminated glass having high resistance to the action of moisture in which any edge separations due to the absorption of moisture at the edges of the plate and the failure of the cement at such edges is reduced to a minimum. One very superior form of cellulose ester plastic, because of its resistance to the absorption of moisture is that formed by the use of dibutyl phthalate as a plasticizer substitute in part or in whole for the camphor ordinarily used, such product being known as dibutyl phthalate pyroxylin plastic; but it is difficult to cement such material, particularly to glass, by the use of the ordinary cements employed in the making of safety glass, such as gelatin, casein or the synthetic resins. I have found that this difficulty can be overcome by the use of a phenol gelatin condensation product from which a cement is produced which holds equally well with the dibutyl phthalate plastic and all ordinary forms of celluloid. This cement is substantially different from and much superior to that formed by merely dissolving gelatin in phenol, as has heretofore been done.

In forming the gelatin phenol condensation product or resin, gelatin and phenol are mixed in varying proportions in water and heated for varying periods depending on the temperature. During this heating process, which is continued in all cases for several hours, the condensation product is produced in the form of a precipitate of soft resin-like appearance which, if left in the solution, will redissolve. If the precipitate is allowed to dissolve in the solution, such solution constitutes the cement, and may be applied to the glass in the form of a spray forming a coating. Two sheets of glass thus coated are applied to the opposite sides of a sheet of plastic, such as the dibutyl phthalate plastic heretofore referred to, and laminated under heat and pressure in the usual way, the temperature ranging around 225 degrees F. and the pressure around 150 pounds per square inch. If desired the precipitate may be removed from the solution and dried for future use. In such case, in order to use it, it is placed in solution in water, the percentage of condensation product to water being preferably in the ratio of 3 to 97, although this may vary widely. The solution thus formed is sprayed on the glass and the sandwich composited under heat and pressure as heretofore described.

The proportion of gelatin to phenol may vary to a considerable extent. Satisfactory results have been obtained with a mixture containing 3 parts of gelatin, ½ to 3 parts of phenol, and sufficient water to make a total of 100 parts. The heating period may range from 5 to 24 hours depending on the temperature. At a temperature of 160 to 180 degrees F., the resin-like precipitate may be formed in 5 hours. One of the most satisfactory proportions of gelatin to phenol is 3 to 1.

The preparation of the product may also be modified by adding formaldehyde, glycerine and diethylene glycol, ethylene glycol and the like. These are preferably added to the solution containing the phenol and gelatin before heating. In a solution containing 3 per cent gelatin and one per cent phenol, these ingredients may range from ½ to 2 per cent and may be included individually or in combination.

Instead of heating the phenol and gelatin with water as heretofore described, the same result may be secured by heating the phenol and gelatin together to form the condensation product and then dissolving such product in sufficient water to give the dilution of the mixture necessary for spraying.

What I claim is:

1. A laminated plate comprising a pair of glass sheets cemented to the opposite sides of a sheet of dibutyl phthalate pyroxylin plastic by a phenol gelatin condensation product.

2. A laminated plate comprising a pair of glass sheets cemented to the opposite sides of a sheet of dibutyl phthalate pyroxylin plastic by a phenol gelatin reaction product obtained by heating gelatin and phenol in a solution to form a resin-like precipitate in which the phenol content is less than the gelatin content.

3. A process of making laminated plate of a glass sheet and a dibutyl phthalate pyroxylin plastic sheet which consists in applying to the faces of one of the sheets a solution containing the reaction product obtained by heating gelatin and phenol in a solution to form a resin-like precipitate in which the phenol content is less than the gelatin content, assembling the sheets with the layer between them and applying heat and pressure to the sheets.

4. A laminated plate comprising a pair of glass sheets cemented to the opposite sides of a sheet of cellulose plastic by a phenol gelatin condensation product in which the phenol content is less than the gelatin content.

5. A laminated plate comprising a pair of glass sheets cemented to the opposite sides of a sheet of cellulose plastic by a phenol gelatin condensation product in which the phenol content ranges from about 16 to 100 per cent of the gelatin content.

PAUL R. MORRIS.